(12) United States Patent  
Power

(10) Patent No.: US 7,861,672 B2
(45) Date of Patent: Jan. 4, 2011

(54) COMMERCIAL POST LARVAL COLLECTOR HABITAT

(75) Inventor: Robert M. Power, Norwich (GB)

(73) Assignee: Carlbbean Sustainable Fisheries Corp., Tortola (VG)

( * ) Notice: Subject to any disclaimer, the term of this patent is extended or adjusted under 35 U.S.C. 154(b) by 0 days.

(21) Appl. No.: 12/653,515

(22) Filed: Dec. 15, 2009

(65) Prior Publication Data

US 2010/0242850 A1   Sep. 30, 2010

Related U.S. Application Data

(63) Continuation of application No. 11/820,929, filed on Jun. 21, 2007, now abandoned.

(60) Provisional application No. 60/815,638, filed on Jun. 22, 2006.

(51) Int. Cl.
*A01K 61/00* (2006.01)
(52) U.S. Cl. .................. 119/236; 119/6.5
(58) Field of Classification Search ............ 119/6.5, 119/6.6, 236–241, 204–214, 234; *A01K 61/00*
See application file for complete search history.

(56) References Cited

U.S. PATENT DOCUMENTS

| | | | |
|---|---|---|---|
| 2,982,246 A | 5/1961 | Kidder et al. | |
| 3,024,764 A | 3/1962 | Brittain et al. | |
| 3,601,095 A | 8/1971 | Olsson | |
| 3,724,423 A | 4/1973 | Day et al. | |
| 3,797,458 A | 3/1974 | Day et al. | |
| 3,853,095 A | 12/1974 | Lawrence | |
| 3,985,101 A | 10/1976 | Thompson | |
| 4,164,199 A | 8/1979 | Pequegnant | |
| 4,186,687 A | 2/1980 | Gilpatric | |
| 4,195,436 A | 4/1980 | Moure | |
| 4,253,418 A | 3/1981 | Lockwood et al. | |
| 4,259,926 A | 4/1981 | Marliave | |

(Continued)

FOREIGN PATENT DOCUMENTS

DE   202005019349   3/2006

(Continued)

OTHER PUBLICATIONS

Database WPI Week 200165 Derwent Publications Ltd., London, GB: AN 2001-575448 XP002457353, dowloaded Jun. 11, 2007.

(Continued)

*Primary Examiner*—Kimberly S Smith
*Assistant Examiner*—M. C.
(74) *Attorney, Agent, or Firm*—Davidson, Davidson & Kappel

(57) ABSTRACT

The collector habitat device comprises panels of non-biodegradable and/or synthetic fibrous material set in durable weatherproof frames and attached to a base; when placed in, the panels hang within the water column providing numerous parallel settlement surfaces for post-larvae. A float assembly, optionally attached to the opposite side of the base from the panels, allows the device to float just below the water's surface. The collector habitat device also incorporates a guard, surrounding the panels, with apertures to allow settlement-stage post-larvae access to the settlement surfaces, while preventing larger organisms and potential predators from gaining access. The collector habitat device also, optionally, incorporates an optionally removable/re-attachable reservoir hung below the guard; and an optional olfactory attractant delivery device.

15 Claims, 2 Drawing Sheets

U.S. PATENT DOCUMENTS

| | | | |
|---|---|---|---|
| 4,368,691 | A | 1/1983 | Brune |
| 4,440,109 | A | 4/1984 | Dugan et al. |
| 4,467,743 | A | 8/1984 | Dugan et al. |
| 4,475,480 | A | 10/1984 | Bodker, Jr. |
| 4,621,588 | A | 11/1986 | Harris ..................... 119/241 |
| 5,081,954 | A | 1/1992 | Monus |
| 5,351,643 | A | 10/1994 | Hughes ..................... 119/6.5 |
| 6,216,635 | B1 | 4/2001 | McRobert |
| 6,561,127 | B2 | 5/2003 | Beattie et al. ............ 119/51.04 |
| 6,561,134 | B1 | 5/2003 | Mikami |
| 2003/0094141 | A1 | 5/2003 | Davis ..................... 119/234 |
| 2005/0229477 | A1 | 10/2005 | Gomez |
| 2008/0017125 | A1 | 1/2008 | Power |

FOREIGN PATENT DOCUMENTS

| | | |
|---|---|---|
| FR | 1358569 | 4/1964 |
| FR | 2157236 | 6/1973 |
| GB | 1329962 | 9/1973 |
| JP | 2001231404 | 8/2001 |

OTHER PUBLICATIONS

Power et al., Preliminary Investigations Into the Feasibility of Small Scale, Commercial Aquaculture of *Panulirus argus*, Based on Collection of Pueruli from the Wild, Centre for Applied Marine Studies, H. Lavity Stoutt Community College, (2005).

Acosta et al., Adaptive Strategies that Reduce Predation on Caribbean Spiny Lobster Post Larvae During Onshore Transport, Limnol. Oceanogr. 44:494-501 (1999).

Atema et al., Larval Reef Fish could use Odour for Detection, Retention and Orientation to Reefs, Mar. Ecol. Prog. Ser., 241:151-160, (2002).

Anon, Report on lobster culture condition in Khan Hoa Province (in year 2000). Unpublished Report, 9 pp.Arango Lopez, L., and M.L. Manrique Sierra. [n.d.] Evaluación delmuso de refugios artificiales en el reclutamiento de juveniles de langosta espinosa, *Panulirus argus*, en las Islas de Providencia y Santa Catalina, Caribe Colombiano. (2000).

Baisre, J., The Cuban Spiny Lobster Fishery, B.F. Phillips and J. Kittaka, (eds.) Spiny Lobsters: Fisheries and Culture, Fishing News Books, Oxford., p. 135-152 (2000).

Bannerot et al., Large-scale Assessment of Recruitment of Post-Larval Spiny Lobsters, *Parnulirus argus*, to Antigua, West Indies., Proc. Gulf Carib. Fish. Inst. 41:471-486 (1988).

Briones-Fourzan et al., Postlarval Recruitment of the Spiny Lobster, *Panulirus argus* (Latrielle 1804) in Bahía de la Ascensión, Q.R. Proc. Gulf Carib. Fish. Inst. 41:492-507 (1988).

Cruz et al., Review of Larval Recruitment Patterns and Variability in Spiny Lobster (*Parnulirus argus*). FAO Fish. Rep. 619:26-32 (2001).

Concei O et al., Eficiencia de um coletor flutuante para a captura de puerulus de lagostas do genero *Panulirus* White, Arq. Ci n. Mar., Fortaleza 30:21-25 (1996).

Gutierrez-Carbonell et al., A Simple Collector for Postlarvae of the Spiny Lobster *Panulirus argus*, Proc. Gulf Carib. Fish. Inst. 41:516-527 (1988).

Grainger R., The State of World Fisheries and Aquaculture; Production, Capture Fisheries., FAO Fisheries Report (2000).

Hair et al., The Use of Wild-caught Juveniles in Coastal Aquaculture and Its Application to Coral Reef Fishes, R. R. Stickney and J. P. McVey, (eds.); p. 327-353, Responsible Marine Aquaculture, CAB International (2003).

Jeffs et al., An Assessment of the Aquaculture Potential of the Caribbean Spiny Lobster, *Panulirus argus*, Proc. Gulf Carib. Fish. Inst. 54:413-426 (2003).

Lellis, W.A., Spiny Lobster: A Mariculture Candidate in the Caribbean?, World Aquaculture 22:60-63 (1991).

Lellis et al., Effect of Temperature on Survival, Growth and Feed Intake of Postlarval Spiny Lobsters, *Panulirus argus*, Aquaculture 90:1-9 (1990).

Munro, J.L., Estimation of the Parameters of the Von Bertalanffy Growth Equation from Recapture Data at Variable Time Intervals, J. Cons. Int. Explor. Mer. 40:199-200 (1982).

Phillips, B.F., A Semi-quantitative Collector of the Puerulus Larvae of the Western Rock Lobster, *Panulirus longipes* Cygnus, George (Decapoda: Palinuridae), Crustaceana 22:147-154 (1972).

Phillips, B.F., Collectors for Catching the Puerulus Stage of Spiny Lobsters: A Summary., Revista Cubana Invest. PesQueras 19(1):33-41 (1995).

Phillips et al., Towards Establishing Techniques for Large Scale Harvesting of Pueruli and Obtaining a Better Understanding of Mortality Rates., Fisheries Research Report, Western Australian Marine Research Laboratories, 144:138. (2003).

Quinn et al., Settlement Variations of the Spiny Lobster (*Panulirus argus*) on Witham Collectors in Caribbean Coastal Waters of St. Thomas, United States, Virgin Islands. Carib. J. Sci. 39:251-267 (1997).

Ting, R.Y., Culture Potential of Spiny Lobster., Proc. 4th Annual Workshop, World Aquaculture Society, p. 165-170 (1973).

Tuan et al., Status of Cage Mariculture in Vietnam, in I.C. Liao and C.K. Lin, (eds.), Cage Culture in Asia, Proceedfings of the First Internatioinal Symposium on Cage Culture in Asia, Asian Fisheries Society and World Aquaculture Society—South-east Asia Chapter, Manila and Bangkok, pp. 111-123 (2000).

Ward, J., Patterns of Settlement of Spiny Lobster (*Panulirus argus*) Post-larvae at Bermuda, Proc. Gulf Carib. Fish. Inst. 39:255-264 (1989).

Pardee et al., Culture of Young Spiny Lobster (*Panulirus argus*): Effects of Density and Feed Type on Growth and Survivorship. ,Proc. Gulf Carib. Fish. Inst. 45:778-79 (1999).

Witham et al., Physiological and Ecological Studies of *Panulirus argus* from the St. Lucie Estuary, Tech. Ser. Fla. Bd. Conserv., 53:1-31 (1968).

Ting, R.Y., Investigation on the Resource Potential of the Spiny Lobster (*Panulirus argus* Latreille) in Puerto Rico. Estado Libre Asociado de Puerto Rico Departmento de Agricultura, Contribuciones Agropecuarias y Pesqueras Organo Oficial de los Servicios Auxiliares y Operaciones Centralizadas, vol. 5, No. 2, Feb. 1973.

COMMERCIAL POST LARVAL COLLECTOR HABITAT

RELATED APPLICATIONS

This application claims priority to U.S. Provisional Application No. 60/815,638, filed Jun. 22, 2006, the disclosure of which is hereby incorporated by reference in its entirety for all purposes.

BACKGROUND OF THE INVENTION

Most of the world's fisheries are threatened by unsustainable fishing practices and pressures. Many fisheries target the adult life phase of the target species as the commercial resource. This is economically effective as long as fishing systems and pressure do not jeopardise the biological integrity of the wild stocks of the target species. However, with many species of marine organism, the individuals that live long enough to become adults numerically represent only a very small percentage of the reproductive effort of the wild population. This small percentage is a result of high mortality rates which occur during the early stages of growth development of the species.

The growth development of many crustaceans and fin fish include five main stages: the egg, larvae, puerulus larvae, juvenile and adult. The eggs are carried by the female until they hatch, becoming larvae. The larvae often drifts in the water freely for about 12 months before becoming puerulus larvae (also known as pueruli or post-larvae). The post-larvae, which look like transparent miniature adults, settle on the bottom of the ocean floor in a phase known as "the settlement phase". It is on the ocean floor where the post-larvae begin the benthic phase, meaning "bottom of the water", and they will grow into juveniles and finally full adults.

For many commercially important crustaceans and fin fish, the critical development stages that succumb to the greatest mortality rates are the settlement phase and the succeeding benthic phase. Settlement phase mortality is generally acknowledged to be in the region of 80-95% of settling post-larvae. Regardless of how many post-larvae settle, various studies show that, of the survivors of the settlement phase, very few will survive the subsequent benthic phase to become adults. Mortality in the first year, post-settlement and during the juvenile phase, has been shown to be similarly high. Therefore, the ideal manner in which to harvest commercial crustaceans and fin fish is to target the progeny prior to the settlement phase, as the removal of up to 80% of settling post-larvae, before they encounter these mortality phases will have virtually no effect on the numbers surviving to become adults and negligible effect on related ecology.

These post-larval marine organisms can be harvested and grown out in aquaculture operations, providing the potential for an extremely lucrative and non-destructive fishery for coastal communities throughout the world. Numerous studies have used different collection techniques to harvest post-larvae with light traps, used to harvest photophyllic fin fish, or settlement/collector habitats, used to harvest post-larval crustaceans.

Several different styles and designs of collectors have been used for small scale studies. Most of these designs are variations of the "Witham collector", which are generally made of closely spaced sheets of air conditioner filter material suspended vertically to form a float, (Witham et al. 1968). Other examples of collectors include the Phillips collector, and variants such as the GuSi collectors (Phillips and Booth, 1994; Phillips 1995), the Mills collector, sandwich collectors and the like. Almost all previous designs of Witham collector described in literature to date, have used natural fibres that have been treated with a rubberising agent to prolong their useful life. More advanced and recent designs have used synthetic fibre material attached to wooden or Styrofoam bases. Because of their cost of manufacture, materials used and/or general design, past designs of post-larval collectors have not been successful for commercial use; being either too costly, not sturdy enough or impractical for large-scale use.

Prior collector designs have encountered issues with 'seaworthiness', unable to withstand harsh sea conditions for long periods of time. Sturdier constructions have proven too costly for commercial use. Additionally, prior designs have not satisfactorily addressed the issues of attracting and retaining post-larvae stage organisms and also result in lower yields as organisms are lost during harvesting.

Thus, there exists a need for, and growing interest in, a device which can aid post-larval stage harvesting on a commercial scale.

The invention described herein addresses these issues; thus providing a cost effective, sturdy design and construction that attracts and retains pre-settlement, post-larval organisms, while also minimizing loss during harvesting.

SUMMARY OF THE INVENTION

The present invention provides a commercial, post larval collector habitat for settlement and collection of post-larval crustaceans or fin fish, e.g., spiny lobster. The materials and construction of the present collector habitat and its ease of construction and use are such that it can be readily used in experimental-commercial or fully-commercial settlement stage harvest fisheries operations.

Thus, the present invention provides a post-larvae collector comprising: (a) a base having a top surface and a bottom surface; (b) at least one panel component attached perpendicularly to the bottom surface of the base further comprising synthetic fibrous material set in a frame; and (c) a guard component which runs along the periphery of the base and encapsulates the panel component(s), the guard component having apertures of a suitable size to allow for the entry of pre-settlement post-larvae into the collector.

In preferred embodiments, the collector habitat device comprises panels of non-biodegradable and/or synthetic fibrous material set in durable weatherproof frames and attached to a base; when placed in water, the panels hang vertically within the water column providing numerous parallel settlement surfaces for post-larvae. A float assembly, optionally attached to the opposite side of the base from the panels, allows the device to float just below the water's surface. The collector habitat device also incorporates a guard, surrounding the panels, with apertures to allow settlement-stage post-larvae access to the settlement surfaces, while preventing larger organisms and potential predators from gaining access. The collector habitat device also, optionally, incorporates a removable/re-attachable reservoir hung below the guard and an optional olfactory attractant delivery device.

The post-larvae collector habitat of the present invention is made of durable, sturdy weatherproof materials, such that the device is able to withstand long periods of time submersed in harshest of open water conditions. Furthermore, the present invention includes collector habitats designed to be easily stored or loaded and unloaded from small or large commercial fishing boats.

DETAILED DESCRIPTION OF THE INVENTION

Figure 1:
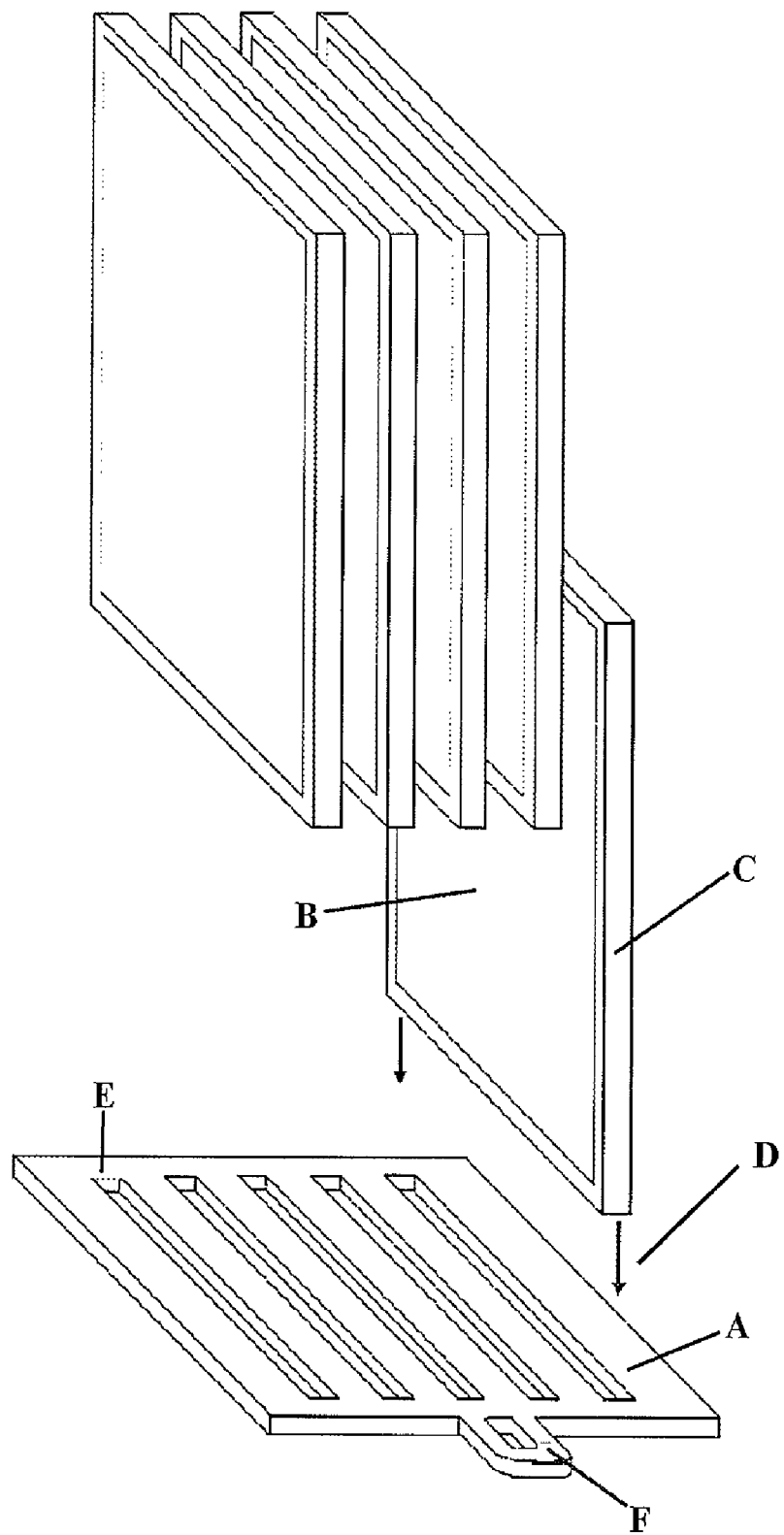
FIG. 1 depicts an isometric projection of the base and panel components in a preferred embodiment of the invention. Annotation A indicates the base to which the panel components B are attached. Each panel component is bordered, or framed, by a rigid material C. Annotation D indicates the mode of attachment of each panel section into the base, in this embodiment, by means of grooves E. The collector habitat device may be tethered to a mooring or deployment line by means of the feature indicated by annotation F.

This invention represents a cost-effective, commercial design of a collector habitat, designed to harvest post-larvae marine organisms, such as crustaceans, fin-fish, bivalves, gastropods, or benthic invertebrates.

The terms "puerulus larvae", "pueruli" and "post-larvae" are used interchangeably herein.

At a minimum, the present invention provides a post-larvae collector comprising: (a) a base having a top surface and a bottom surface; (b) at least one panel component attached perpendicularly to the bottom surface of the base further comprising synthetic fibrous material set in a frame; and (c) a guard component which runs along the periphery of the base and encapsulates the panel component(s), the guard component having apertures of a suitable size to allow for the entry of pre-settlement post-larvae into the collector. Embodiments of the device of the present invention additionally include a reservoir, olfactory attractant device and/or flotation assembly.

The collector habitat device of the present invention comprises panels of non-biodegradable and/or synthetic fibrous material set in durable weatherproof frames and attached to a base; when placed in water, the panels hang vertically downward within the water column providing numerous parallel settlement surfaces for post-larvae. A float assembly, optionally attached to the opposite side of the base from the panels, allows the device to float just below the water's surface. The collector habitat device also incorporates a guard, surrounding the panels, with apertures to allow settlement-stage post-larvae access to the settlement surfaces, while preventing larger organisms and potential predators from gaining access. The collector habitat device also, optionally, incorporates a removable/re-attachable reservoir hung below the guard. Additionally, an optional olfactory attractant delivery device may be included to create an olfactory plume which allow the collector habitat device to achieve a dramatically larger fishing profile in the water by attracting pre-settlement post-larvae which would normally settle outside the area of the device.

The "mesh," or otherwise permeable, guard provides the advantages of structural complexity—thereby attracting the target organisms—and protection from predators (with apertures small enough to prevent predators from entering the device)—thereby maximizing survival rates of the target organisms and, accordingly, harvesting of the same. Additionally, the apertures of the guard are of a size suitable to attract, retain and trap the target organisms, i.e., small enough to allow pre-settlement organisms to enter, but not large enough to allow grown organisms to escape or move from the settlement surfaces of the device.

The collector habitat device may also incorporate a reservoir attached to the bottom of the guard (or device as it floats in the water) to catch the post-larvae after they drop from the panels when the device is removed from the water. This reservoir provides many advantages as it retains the catch, or harvested pueruli, in a pool of water of appropriate temperature and chemical composition, such that the harvested organisms do not suffer from shock or dehydration. This also increases the survival rate of delicate harvested post-larvae. The reservoir also allows for quick and accurate recording of the catch from each device.

The device can assume a wide range of shapes and sizes to adapt for use in small boats or in large scale commercial vessels, or for stacking for easy storage. The device is designed to operate for long periods of time immersed in sea water and have a useful life of several years. In a preferred embodiment, the collector habitat device is constructed of weatherproof, durable materials designed to withstand the harsh conditions that continued wave action produces. In most preferred embodiments, plastics or other cost-effective weatherproof materials are used.

In some embodiments, the collector habitat device of the invention is deployed in shallow coastal waters, but is capable of being deployed as deep as 100 m, or even 200 m. The collector habitat device preferably floats below the surface of the water and provides attractive settlement media for a range of post-larval coral reef organisms, e.g., spiny lobsters.

As stated above, the device incorporates weather resistant and strong methods of construction. The panels, or settlement surfaces, are preferably made of non-biodegradable synthetic fibres, set within robust, weatherproof frames. The materials used and methods of manufacture encompass all materials and methods familiar to those of skill in the art. In preferred embodiments, cost of manufacture is balanced against weatherproof/durable construction, to result in a commercially practical device. Thus, any robust materials that will not alter the water chemistry or result in toxicity to the target species can be used, such as e.g., plastics, weatherproof non metallic alternatives or non-reactive metals/metal alloys. Furthermore, any practical methods for moulding or otherwise working with such materials are also encompassed by this disclosure.

The specific components of the collector habitat are discussed further below:

The Base and Panel Components

Figure 2:
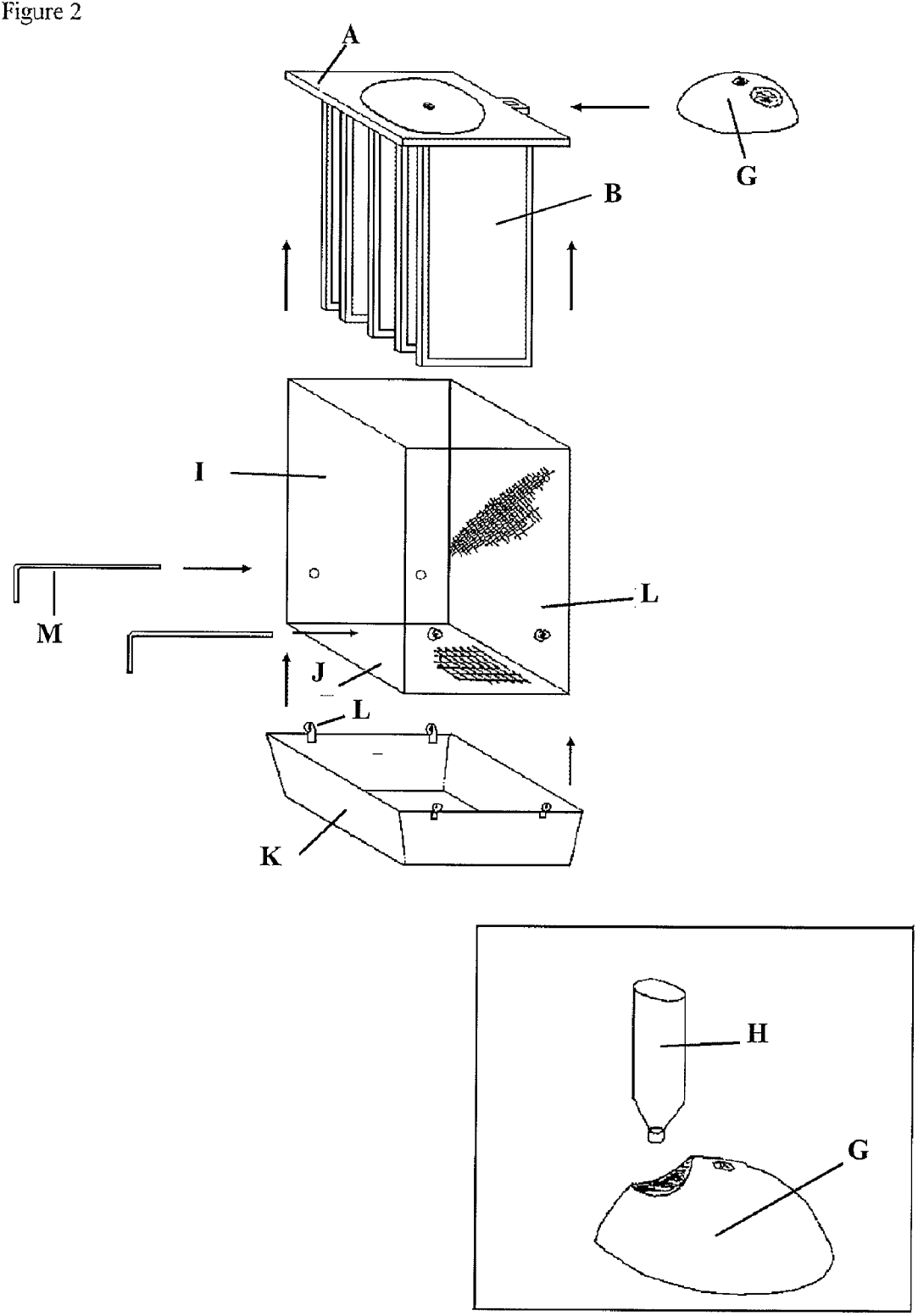
FIG. 2 depicts another embodiment of the collector habitat device of the invention. Annotation A shows the base and annotation B shows the panels, as exemplified in FIG. 1. Annotation G is a float component which attaches to the top of the collector. Annotation H shows an example of a suitable olfactory attractant reservoir and a recess in the float component to accommodate it. The structure indicated as I is a guard. The guard attaches to the periphery of the base A such that it encloses the panels B. Annotation J indicates the bottom section of the guard. Annotation K shows a representation of the reservoir device which, in certain embodiments, re-attachable to the guard, e.g., by means of retaining rod loops L, through which wire lengths M may be inserted and bent to secure the assembly.

Examples of preferred embodiments of this invention are illustrated in FIGS. 1 and 2. The device, as illustrated in FIG. 1, comprises a base and panels. The base may be any shape, e.g., rectangular, and may be made of plastic, such as polypropylene, polyvinyl chloride, polyethylene, polymethyl methacrylate and other acrylics, silicones, polyurethanes, etc. or any combination of polymers that yields a sturdy and weatherproof base. Preferably, the plastics used are capable of forming a solid, UV-resistant substance with high mechanical strength that may be repeatedly reduced to a liquid or semi-liquid in a simple oven without affecting the structural integrity of the solidified substance thereafter. In a preferred embodiment, the base is less than 4 cm thick and sized such that the resulting collector habitat can be easily deployed from a small boat by a single human operator; however, larger sizes may, of course, be made, if desired.

The base may be formed, for example, by injection moulding or by cutting a sheet of suitable plastic, or more preferably, by heat moulding. In a preferred embodiment, the base is heat moulded and before it cools, the panel components are inserted into the molten base, such that one edge is incorporated within the base, with the plastic border material becoming hot enough that it molecularly combines with the plastic of the base. By this process the base and panels are assembled in one operation and form a robust and rigid permanent structure.

In the most preferred embodiments of the invention, the spacing between panels vary from about 1 cm to about 5 cm, and most preferably from about 1 cm to about 3 cm, with the number of panels attached to each base varying from 2 to 30, and more preferably from 5 to 20. In other embodiments, the base also includes a means for attaching a deployment line and/or a means for accommodating a rope anchor for a float component, e.g., a hole may be drilled through the middle of the base in order to accommodate such accessories for the device.

The panel components of this device also may vary in dimension to yield a device that can be easily handled by a single operator from a small boat or that is practical for large commercial operations. As previously stated, the panels comprise a synthetic, fibrous material set in weatherproof frames. Examples of such synthetic fibrous material include, e.g., materials generally associated with domestic and industrial scouring pads. Once cut to the desired dimensions, this material is set into a frame. Preferably, the frame is made from the same material as the base. In preferred embodiments, the frame is formed by forcing the edges of the fibrous synthetic material into a molten plastic frame, so that the fibres of the material infiltrate the molten plastic frame and eventually a rigid frame is formed once the panel cools/solidifies.

The Guard

The guard component (FIG. 2, D and E) is attached to the periphery of the base, preferably by welding for sturdy/permanent attachment. The guard component may be any size or shape suitable to completely encapsulate the panels. For example, in FIG. 2, the base is rectangular and the guard is a complimentary four-sided box shape. The guard is preferably made from a weather resistant material having apertures large enough to allow for the free flow of pre-settlement pueruli, but small enough to prevent entry of predators. Any weatherproof, durable, cost-effective material can be used which will not alter the water chemistry or effect the life cycle of the target species. The dimensions of the sides of the guard will vary in proportion to the size of base and panel assembly. One of skill in the art would be capable of utilizing other techniques which would also be suitable for constructing the guard component.

In preferred embodiments, the size of the apertures in the guard are about 4-8 mm. In more preferred embodiments, the apertures in the bottom of the guard are larger than those in the sides of the guard, to allow trapped organisms that have grown in size to easily fall through the apertures in the bottom when the device is lifted out of the water, and into the optional reservoir. In such an embodiment, the size of the apertures in the sides of the guard may be about 4-8 mm, while those in the bottom of the guard are preferably 8-12 mm.

In other embodiments, small concrete weights may be tied to the bottom edges of the guard to ensure the desired orientation in the water.

The Reservoir Component

The reservoir of the invention is a light weight container that sits under the guard. Ideally, there is a gap between the bottom mesh of the guard and the bottom of the reservoir, preferably around 3 cm deep. The reservoir is designed to be easily removed and reattached to the device and sized to fit snugly around the bottom of the guard with sides extending up over a portion of the sides of the guard. In preferred embodiments, the sides may extend up over to about 5 cm up from the bottom of the guard and have drainage slits (preferably less than 1 mm) cut into the reservoir sides to allow water to drain out of the reservoir when the device is removed from the water. The drainage slits are preferably situated such that a small quantity of water remains in the bottom of the reservoir. In such an embodiment, the drainage slits may be within about 1.5 cm from the bottom of the reservoir.

Thus, when the device is removed from the water, the collected organisms may drop off the panels/settlement surfaces, through the apertures of the bottom of the guard and into the reservoir. Furthermore, since the reservoir is designed to retain some of the water as well, the organisms are collected in a water-filled reservoir; and the water is of the same composition and temperature to which the organisms have grown accustomed—thereby minimizing any loss from the shock of removal.

In a preferred embodiment, the reservoir is removably attached to the guard, e.g., by plastic loops (H) on the sides of the guard and reservoir, through which rods (G) are inserted to secure them in place. In preferred embodiments, the rods are a plastic coated metal wire, although other materials capable of securing the reservoir to the guard may be used.

The Float Component

The device of the present invention, optionally, includes a float component (FIG. 2, B) made of any non-absorbent flotation material of sufficient volume to maintain the habitat device just below the water's surface. In preferred embodiments, the float has one reinforced hole through its centre of gravity to accommodate a rope anchor. In more preferred embodiments, the float has an additional hole for accommodating an olfactory attractant reservoir (FIG. 2, C). The float may be attached to the base by any means, e.g., a simple rope. In such an embodiment, the rope may be fed up through a hole in the centre of the base and up through the float and secured accordingly.

The Olfactory Device

In certain embodiments of the invention, the collector habitat device also contains an olfactory device which dispenses an olfactory attractant into the water. This olfactory attractant is designed to attract the target pueruli. The olfactory device may be any form of weatherproof container. In preferred embodiments, the olfactory device has a volume of one litre or less and a tapered delivery end or opening for easy distribution of the olfactory attractant. Other preferred embodiments, include a high density filter at the mouth of the olfactory device that serves to retard the rate of diffusion of contents into the surrounding waters.

The olfactory attractant may be any substance which is capable of attracting the target pueruli and is easily dispersed into the water. In the most preferred embodiments, the attractant is a liquid concentrate made from extracts of biological products and/or by-products. A most preferred embodiment of the olfactory attractant is a mixture made from *Rhizophora mangle*; *Laguncularia racemosa*; *Gracilaria* species; *Nasutitermes; acajutlae*; and combinations thereof. In a more preferred embodiment, the olfactory attractant liquid comprises from about 40-60% *Rhizophora* mangle; from about 5-10% *Laguncularia racemosa*; from about 20-40% *Gracilaria* species; and from about 5-10% *Nasutitermes; acajutlae*.

What is claimed:

1. A post-larvae collector comprising:
   (a) a base having a top surface and a bottom surface;
   (b) at least one panel component attached perpendicularly to the bottom surface of the base further comprising synthetic fibrous material set in a frame;
   (c) a guard component which runs along the periphery of the base and encapsulates the panel component(s), the guard component having apertures of a suitable size to allow for the entry of pre-settlement post-larvae into the collector; (d) a float component attached to the top of the base; and (e) an olfactory dispensing device containing an olfactory attractant, attached to the float component, wherein the olfactory attractant comprises about 40-60% *Rhizophora* mangle; from about 5-10% *Laguncularia racemosa*; from about 20-40% *Gracilaria* species; and from about 5-10% *Nasutitermes acajutlae*.

2. The collector of claim 1, wherein the collector comprises from about 2 to about 30 panel components.

3. The collector of claim 2, wherein panel components are spaced from about 1 cm to about 3 cm apart.

4. The collector of claim 1, wherein the guard component comprises a weather resistant mesh material.

5. The collector of claim 1, wherein the guard component comprises apertures from about 4 to about 8 mm in size.

6. The collector of claim 1, wherein the guard component running along the periphery of the base comprises sides of the collector and a bottom of the collector.

7. The collector of claim 6, wherein the guard component at the bottom of the collector has apertures which are larger than the apertures of the guard component at the sides of the collector.

8. The collector of claim 7, wherein the apertures of the bottom of the guard component are from about 8 to about 12 mm in size and the apertures of the sides of the guard component are from about 4 to about 8 mm in size.

9. The collector of claim 6, further comprising a reservoir attached to the bottom of the guard, wherein the reservoir comprises sides which extend up over a portion of the sides of the guard.

10. The collector of claim 9, wherein the reservoir is removable and re-attachable.

11. The collector of claim 9, wherein the reservoir comprises a light weight plastic material.

12. The collector of claim 9, wherein the reservoir comprises drainage slits in the sides of the reservoir.

13. The collector of claim 1, wherein the base is rectangular the base.

14. A method of harvesting post-larvae marine organisms, comprising
   (a) inserting a collector habitat device as defined in claim 1 into a body of water inhabited by marine organisms,
   (b) allowing sufficient time for pre-settlement post-larvae marine organisms to enter the device, settle to the panels and grow to a desired post-larvae stage; and
   (c) removing the collector habitat device from the water and harvesting the post-larvae marine organisms.

15. The method of claim 14, wherein the collector habitat further comprises a reservoir attached to the bottom of the guard for collecting the post-larvae after removing the collector habitat device from the water.

* * * * *

UNITED STATES PATENT AND TRADEMARK OFFICE
CERTIFICATE OF CORRECTION

| | | |
|---|---|---|
| PATENT NO. | : 7,861,672 B2 | Page 1 of 1 |
| APPLICATION NO. | : 12/653515 | |
| DATED | : January 4, 2011 | |
| INVENTOR(S) | : Robert M. Power | |

It is certified that error appears in the above-identified patent and that said Letters Patent is hereby corrected as shown below:

On the Title Page, Item (73)

Accordingly, Applicants respectively request that the issued patent be corrected to state the name of the Assignee correctly as CARIBBEAN SUSTAINABLE FISHERIES CORP.

Signed and Sealed this
Thirtieth Day of September, 2014

Michelle K. Lee
*Deputy Director of the United States Patent and Trademark Office*